March 28, 1944.   M. G. LEONARD   2,345,131
PROTECTIVE DEVICE FOR ELECTRICAL APPARATUS
Filed Aug. 6, 1942   2 Sheets-Sheet 1

WITNESSES:
Edward Michaels

INVENTOR
Merrill G. Leonard.
BY
Franklin E. Hardy
ATTORNEY

March 28, 1944.   M. G. LEONARD   2,345,131
PROTECTIVE DEVICE FOR ELECTRICAL APPARATUS
Filed Aug. 6, 1942   2 Sheets-Sheet 2
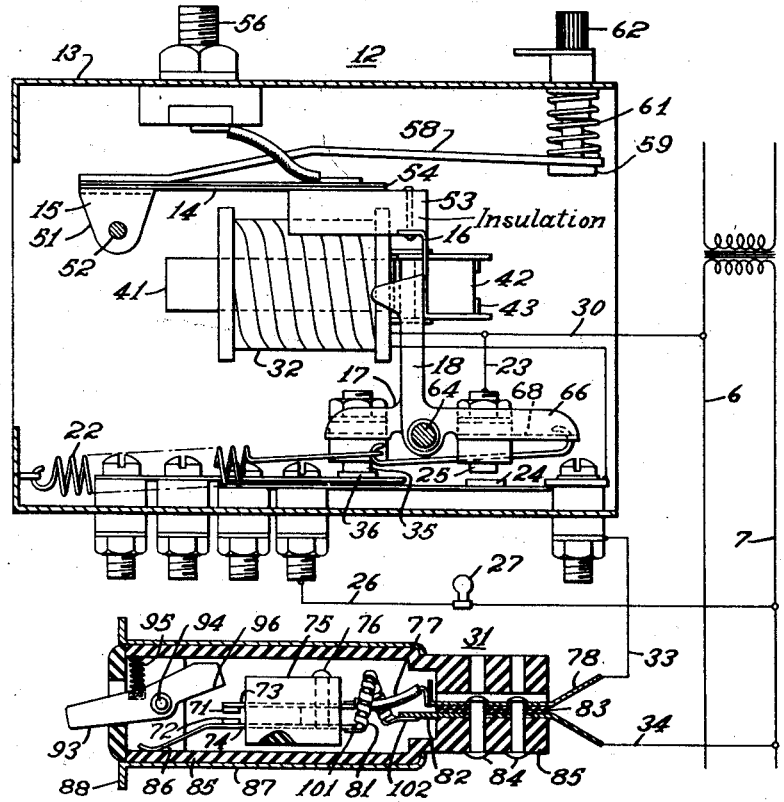
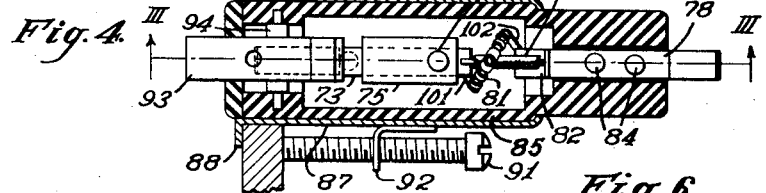
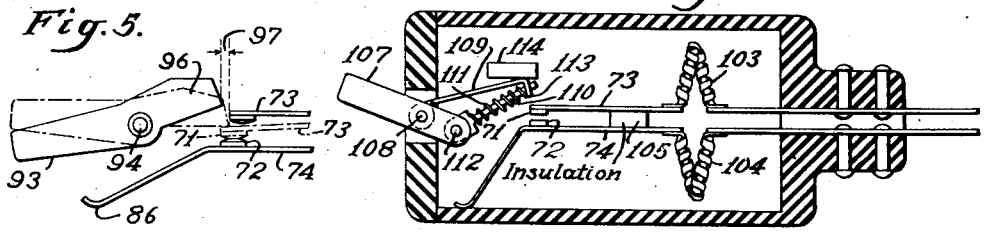
WITNESSES:
Edward Michaels
INVENTOR
Merrill G. Leonard.
BY
Franklin E. Hardy
ATTORNEY Patented Mar. 28, 1944

2,345,131

UNITED STATES PATENT OFFICE 2,345,131

PROTECTIVE DEVICE FOR ELECTRICAL APPARATUS

Merrill G. Leonard, Sharon, Pa., assignor to Westinghouse Electric & Manufacturing Company, East Pittsburgh, Pa., a corporation of Pennsylvania Application August 6, 1942, Serial No. 453,787

9 Claims. (Cl. 175—294)

This invention relates to protective equipment for electrical apparatus and, more particularly, to circuit controlling devices for use in such electrical apparatus.

In such electrical apparatus, it is frequently desired to provide means for protecting the apparatus from damage that may be caused by overheating due to overloading the apparatus, and it is common practice to provide a circuit breaker controlled by a thermally responsive element that is operative to interrupt the load circuit of the apparatus upon the occurrence of a predetermined condition. A condition that might be used for causing the circuit breaker to operate to interrupt the load circuit is the heating of the apparatus caused by an overload that is sustained for too long a period. The thermally responsive element may also be effective to give an indication somewhat prior to the occurrence of a condition necessary to unload the apparatus indicating that such a condition is nearly reached.

In distribution apparatus, where the amount of power used per unit is small, it is usual to provide the circuit breaker as above described for directly interrupting the load circuit on the low voltage side and to provide mechanical means having an operating handle extending outside the apparatus for manually resetting the thermally responsive control device after it has operated in response to the predetermined condition, so that the device will again be positioned ready to operate upon a repetition of the condition. In larger apparatus, the same type of circuit breaker device may be used as a relay for controlling a main breaker so that both sets of breaker contacts, that is, those which control the alarm or indicating signal circuit and those which control the circuit for interrupting the main load current through the apparatus may both be used to control relay circuits.

In my copending application for Protective devices for electrical apparatus, filed December 5, 1941, Serial No. 421,787, and assigned to the same assignee as this application, a protective system is described in which a circuit breaker controlling device is employed that is sensitive to the condition of an electrical apparatus as determined by a thermally responsive element which is arranged to release a plurality of latch arms. One of these latch arms trips when a predetermined limiting condition on the apparatus occurs in order to effect the loading of the apparatus, and the other trips prior to the occurrence of this limiting condition to indicate that the condition is nearly reached. This second named latch when released operates to close a circuit including a high impedance indicating device and a resetting device that when sufficiently energized operates to return the two latch arms to their initial position from which they may be again released upon a further occurrence of the predetermined condition of the apparatus effecting their operation.

When, as in the system of my above referred to application, the operating coil of the resetting device is connected in series circuit relation with the high impedance indicating device, the resetting device is not sufficiently energized to cause its operation. It is necessary, therefore, to shunt the high impedance device from the series circuit when it is desired to effect the operation of the resetting device. In my copending application above referred to, such a switch is provided for shunting the high impedance device from the series circuit. In the circuit arrangement provided in the copending application, the circuit through the resetting coil which returns the latch arms to their normal or latched positions includes switch contact members that are separated by movement of the latch to such positions so that the energizing circuit of the coil may be interrupted slightly prior to the completion of the return of the latch arms to their latched positions, the completion of this operation depending upon the inertia of the moving armature cooperating with the coil.

It is an object of the present invention to provide protective equipment for electrical apparatus of the above-indicated character in which means are provided for energizing the resetting device that is independent of the latch controlled circuit, and that automatically interrupts the resetting device energizing circuit independently of the operator.

Other objects and advantages of the invention will be apparent from the following description of a preferred embodiment of the invention, reference being had to the accompanying drawings, in which:

Fig. 3 is a diagrammatic view including a sectional view of the relay device taken along the lines III—III in Fig. 2, and a sectional view of a resetting switch mechanism taken along the lines III—III in Fig. 4;

Fig. 4 is a horizontal sectional view of the resetting switch shown in Fig. 3;

Fig. 5 is a diagrammatic view of a portion of the switch shown in Fig. 3; and

Fig. 6 is a sectional view of a modified form of the resetting switch.

Figure 1:
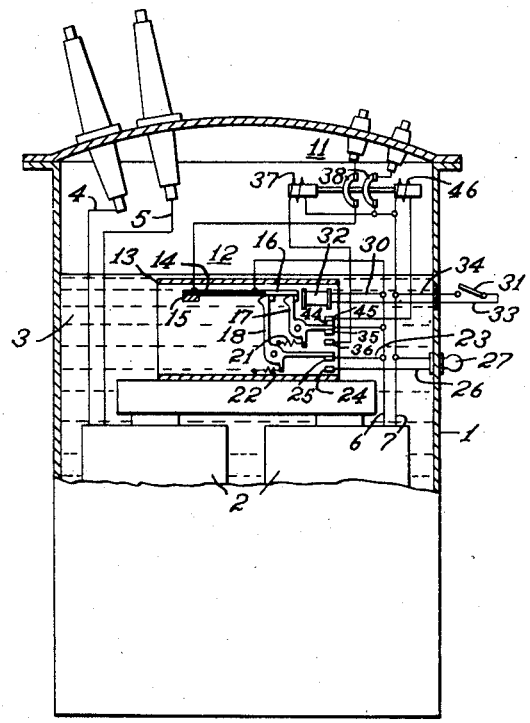
Figure 1 is a diagrammatic view of circuits and apparatus illustrating the application of a thermally controlled relay device for controlling an indicating circuit and a circuit breaker control circuit.
Figure 2:
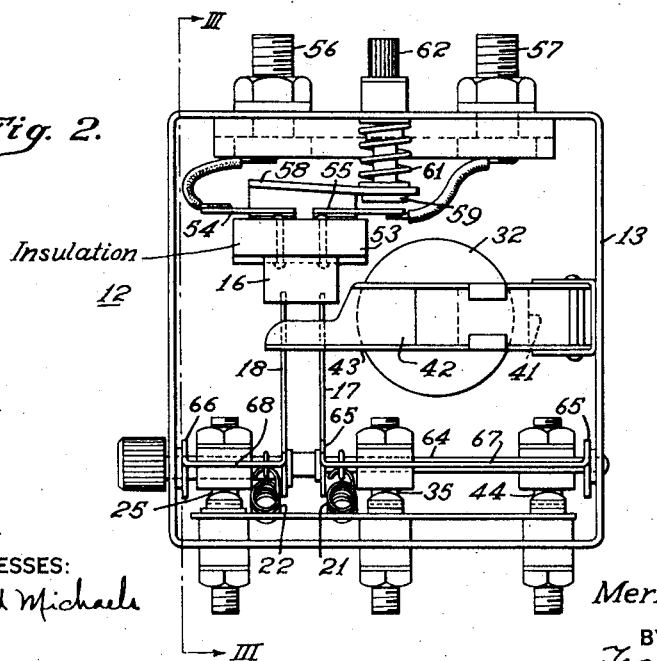
Fig. 2 is an end view of the relay device diagrammatically illustrated in Fig. 1.

Referring to the drawings and, more particularly, to Fig. 1 thereof, an electrical apparatus is illustrated including an apparatus case 1 housing a core and coil assembly 2 immersed in an insulating liquid 3 and provided with high terminal voltage conductors 4 and 5 and low voltage terminal conductors 6 and 7 which may be connected to high voltage and low voltage external circuits through conventional bushings in a well known manner. The circuit breaker, indicated generally at 11, is provided for connecting the conductors 6 and 7 to the outside circuit and is controlled by a relay, indicated generally at 12, that is immersed in the insulating liquid 3. The relay comprises a casing 13 about a bimetal element 14 that is shown included in the circuit of conductor 6 so that the bimetal is responsive both to the flow of current through the conductor 6 and to heat resulting from the temperature of the liquid 3 in which the apparatus is immersed. The bimetal element 14 is so physically arranged that one end is mounted on a relatively fixed abutment 15, and the other end is free to move and carries a catch 16 that is adapted to engage latches 17 and 18 to normally retain them in their illustrated positions against the pull of the springs 21 and 22, respectively. The latches 17 and 18 are so arranged that the latch 18 has the lesser overlap with the catch 16, as best shown in Fig. 2, so that as the bimetal 14 is heated and the catch 16 moves upwardly, the latch arm 18 will be the first to be released. When released, the latch arm 18 will be forced by the spring 22 to close contacts 24 and 25, thus completing a circuit between conductors 6 and 7 through conductor 23, contact members 24 and 25, conductor 26, signal device 27, to conductor 7. The closing of this circuit operates the signal device 27 and notifies the operator that the apparatus is loaded nearly to its maximum capacity, thus giving an opportunity to rearrange the load and prevent further increase in the heating of the apparatus.

Should the overload on the apparatus continue sufficiently that the bimetal element 14 causes the catch 16 to continue its upward movement, the latch arm 17 will also be released and operated by the spring 21 to cause movement of the contact member 35 into engagement with the contact member 36 to close a circuit through the opening winding 37 of the breaker 11 to actuate the contact members 38 from their circuit closing positions and interrupt the load circuit through the apparatus. When the apparatus has cooled sufficiently to permit return of the catch member 16 to a position to engage the latch arms 17 and 18, operation of the switch 31 to its circuit closing position closes a circuit from conductor 7, through conductor 34, switch 31, conductor 33, coil 32 and conductor 30 to the conductor 6 causing the energization of the closing coil 32 energizing its associated core 41 and armature 42, best shown in Figs. 2 and 3, and causing movement of an arm 43 carried by the armature against the latch arms 17 and 18 to return them to their illustrated or latched positions. Upon return of the latch arm 17 to its latched position, a circuit is closed through contact members 44 and 45 for energizing the closing coil 46 of the circuit breaker 11 and operating the contact members 38 to their circuit closing positions.

It will be appreciated that this circuit is diagrammatic only, and that the circuit may be so arranged that the relay closes one point only in the circuit, the final completion of the circuit being manually controlled after being conditioned by the operation of the relay.

The description thus far has been directed largely to the circuits and basic elements of the apparatus shown in Fig. 1, the detailed arrangement of the parts of the relay device 12, and the resetting switch associated therewith is shown in greater detail in the remaining figures of the drawings.

Referring to Figs. 2 and 3, the bimetal element 14 is positioned with its relatively fixed end mounted on a yoke 15, the outer ends of which are turned down to form flanges 51 that are pivotally mounted on a shaft 52 attached to the casing 13. The movable end of the bimetal 14 carries a molded insulating block 53 upon which the catch 16 is mounted. The bimetal element 14 may be U-shaped and provided with terminals 54 and 55 mounted on the block 53 and connected to terminal studs 56 and 57, respectively, mounted at the top of the casing 13. An adjusting arm 58 is attached to the yoke 15, the outer end of which is positioned by a bolt 59 and spring 61 which may be adjusted by a nut 62. As shown in Figs. 2 and 3, the latch members 17 and 18 are mounted on a shaft 64 extending from one side to the other of the casing 13. The latch members 17 and 18, in addition to the upwardly extending latch arms, are provided with vertical flange portions 65 and 66, respectively, connected by horizontal portions 67 and 68. The vertical flange portions are provided with openings forming the bearings upon the shaft 64 and the horizontal portions carry the movable contact members controlled by the latches.

Referring to Figs. 3, 4, and 5, the resetting switch shown generally at 31 includes a pair of contact members 71 and 72 mounted on leaf springs in the form of metal strips 73 and 74 that are mounted on a supporting block structure 75 by a suitable means such as a rivet 76. The strips 73 and 74 are self-biasing and normally maintain the contact members 71 and 72 separated. The metal strip 73 is connected by a conductor 77 and metal strip 78 to the conductor 33, and the metal strip 74 is connected through a double helix bimetal element 81, and strip 82 to the circuit conductor 34. The metal strips 78 and 82 are shown positioned on opposite sides of insulating strips 83 and held in place by rivets 84 which pass through a portion of the insulating material forming the casing 85 about the switch assembly structure. The leaf spring member 74 is extended, as shown at 86, to engage the inner surface of the casing structure 85 to thereby support the movable switch assembly structure within the casing. A metal casing 87 is shown positioned about the greater portion of the insulating casing structure 85 and provided with flanges 88 for engaging one wall of a supporting panel board 89. Screw members 91 are provided mounted in lugs 92 for engaging the opposite wall of the panel board 89 for clamping the resetting switch in position. An operating member for the switch is provided having a handle portion 93 extending through an opening in one end of the casing 85 and mounted on a pivot 94. A spring member 95 is provided for biasing the handle 93 to the illustrated position in which the surface 96 is out of engagement with the metal strip 73.

When it is desired to energize the resetting coil 32 of the circuit interrupter 12, after either of the latches 17 or 18 has been released by operation of the bimetal strip 14, the handle 93 of the resetting switch is moved upwardly, causing the surface 96 to engage the end of the metal strip 73 and force it downwardly, closing a circuit through the contact members 71 and 72 for energizing the resetting coil 32. Upon the flow of current through the contact members 71 and 72, the bimetal helix 81 is heated by the flow of current therethrough. The bimetal member 81 is constructed as a double helix, that is, the bimetal strip is formed into a number of turns of relatively small radius, and the coiled element comprising this number of helical turns of small radius are then formed into a helix of relatively large diameter, which, in Fig. 3, is shown as comprising a single turn. A bimetal element of this character has the characteristic of expanding or contracting along its axis as it is heated, depending upon the relative positions of the two metals. As shown the two ends 101 and 102 of the bimetal move toward each other as the bimetal element is heated and away from each other as the bimetal element cools. Since the end 102 is anchored on the strip 82, this relative movement of the opposite ends of the bimetal moves the end 101 together with the entire switch assembly comprising the insulating block 75, and the strips 73 and 74 toward the right, as viewed in Fig. 3, the end 83 of the lower strip 74 sliding along the inner surface of the casing 85. As the switch contact assembly moves toward the right, the end of the strip 73 will, after a short time interval, disengage the surface 96 of the operating member and move upwardly to the dotted line position shown in Fig. 5, thus interrupting the circuit through the switch contact members 71 and 72, thus preventing the coil 32 from becoming overheated. A limited time is required for the bimetal 81 to cool and again move the switch contact assembly toward the left so as to bring it within a range of positions in which the surface 96 may again engage the end of the strip 73, and close the circuit through the switch contact members 71 and 72. The dimension 97 shown in Fig. 5 shows the amount of movement of the assembly toward the left that is necessary for engagement of the strip 73 by the surface 96 after the member 73 has moved to its released or dotted line position. The amount of movement of the member 73 from its full line position to its dotted line position has been somewhat exaggerated for the purpose of better showing that the horizontal component 97 of the movement of the engaging corner 96 of the member 93 between the full line position and the dotted-line position of the member 73 will determine the amount of movement of the switch contact assembly toward the left after separation of the contact members 71 and 72 that is necessary before these members may again be brought into engagement by movement of the handle 93. The time during which the contact members 71 and 72 will remain closed before being separated by the operation of the bimetal element 81 will be governed by the amount of overlap between the surface 96 at the latch end of the handle 93 and the characteristics of the bimetal element 81.

A modified form of the switch 31 is shown in Fig. 6 in which two bimetal elements 103 and 104 are shown in place of the single element 81 in Fig. 3, the element 103 being connected to the metal strip 73, and the element 104 to the metal strip 74 which are positioned mounted upon an insulating block 105 by any suitable means. In this modification of the invention, the operating handle 107 is shown mounted on a pivot 108 to which a separate member 109 is also mounted for engaging the pivot strip 73. A compression spring 111 is connected between the blocks 112 and 113 mounted on members 107 and 109, respectively, and about a guide rod 110 to provide a snap action of the member 109 downwardly upon a sufficient movement of the handle 107. A stop 114 is shown for limiting the upward motion of the member 109.

With the reset switch illustrated, it will be noted that the contacts trip open independently of the movement of the handle, effecting a quick break on automatic operation resulting from the heating of the bimetal. The switch is reset for further closing by moving the handle to or beyond open position, but further operation to a closing position is dependent upon a time interval determined by the time required for cooling of the bimetal element and movement of the contact assembly within a range where it may be again controlled by the operating handle.

In the form of the invention shown in Fig. 6, a quick make and break is likewise also insured upon manual operation of the switch handle, and by dividing the bimetal into two portions, a greater mechanical force is exerted for moving the switch contact assembly, which is particularly advantageous in cases where small currents flow through the reset switch.

Modifications in the structure disclosed within the spirit of my invention will be apparent to those skilled in the art, and I do not wish to be limited otherwise than by the scope of the appended claims.

I claim as my invention:

1. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a pair of circuit controlling members mounted upon a movable support and normally biased from engagement with each other, operating means for actuating said circuit controlling members into engagement with each other and thermally responsive means heated in accordance with the current flowing through said contact members for moving said support for releasing said circuit controlling members from control by said operating means for effecting the separation of the circuit controlling members.

2. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a pair of contact members carried by self-biasing spring members mounted upon a movable support for biasing said contact members from engagement with each other, operating means for actuating said circuit controlling members into engagement with each other and thermally responsive means heated in accordance with the current flowing through said contact members for moving said support for releasing said circuit controlling members from control by said operating means for effecting the separation of the circuit controlling members.

3. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a pair of circuit controlling members mounted upon a movable support and normally biased from engagement with each other, operating means for actuating said circuit controlling members into engagement with each other, and a bimetal element formed as a double helix and heated by the flow of current through the switch contact members for moving said movable support for releasing said contact members from control by said operating means for effecting the separation of the switch contact members, said bimetal element being effective upon the interruption of current flow through said switch contact members for returning said movable support after a time interval to a position for establishing further control of said contact members by said operating means.

4. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a movable assembly comprising a supporting member, a pair of self-biasing circuit controlling members mounted thereon and switch contact members carried thereby and normally biased to circuit interrupting positions, operating means for engaging one of said controlling members for closing a circuit through said switch contact members, a bimetal element formed as a double helix and heated by the flow of current through the switch contact members for moving said movable assembly for releasing said contact members from control by said operating means for effecting the separation of the switch contact members, said bimetal element being effective, upon the interruption of current flow through said switch contact members for returning said movable assembly after a time interval to a position for establishing further control of said contact members by said operating means.

5. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a movable assembly comprising a supporting member, a pair of self-biasing circuit controlling members mounted thereon and switch contact members carried thereby and normally biased to circuit interrupting positions, operating means for engaging one of said circuit controlling members for closing a circuit through said switch contact members, a bimetal element formed as a double helix and heated by the flow of current through the switch contact members for moving said movable support for releasing said contact members from control by said operating means for effecting the separation of the switch contact members, said bimetal element being effective, upon the interruption of current flow through said circuit controlling members for gradually returning said movable assembly from a zone of positions in which the operating means is ineffective to control the contact members to a zone of positions in which the operating means establishes control of said contact members by said operating means.

6. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a movable assembly including a supporting member, a pair of self biasing circuit controlling members mounted thereon and switch contact members carried thereby and normally biased to circuit interrupting positions, operating means for engaging one of said circuit controlling members for closing a circuit through said switch contact members, a pair of bimetal elements each formed as a double helix and each connected to one of said switch contact members and heated by the flow of current therethrough for moving said movable assembly for releasing said contact members from control by said operating means for effecting the separation of the switch contact members, said bimetal elements being effective, upon the interruption of current flow through said switch contact members for returning said movable support after a time interval to a position for establishing further control of said contact members by said operating means.

7. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a pair of contact members carried by elongated self-biasing leaf-spring circuit controlling members mounted upon a movable support and normally biased from engagement with each other, operating means movable transversely of the direction of said circuit controlling members for engaging the end of one of said members for actuating said circuit controlling members into circuit closing position and thermally responsive means heated in accordance with the current flowing through said contact members for moving said support for carrying said members out of the path of movement of said operating means for releasing said circuit controlling members from control by said operating means for effecting the separation of the circuit controlling members.

8. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a movable assembly comprising a supporting member, a pair of elongated self-biasing leaf-spring circuit controlling members mounted thereon and switch contact members carried thereby and normally biased to circuit interrupting positions, operating means movable transversely of the direction of said circuit controlling members for engaging the end of one of said circuit controlling members for closing a circuit through said switch contact members, a bimetal element formed as a double helix and heated by the flow of current through the switch contact members for moving said movable support for carrying said circuit controlling members out of the path of movement of said operating means for releasing said contact members from control by said operating means for effecting the separation of the switch contact members, said bimetal element being effective, upon the interruption of current flow through said circuit controlling members for gradually returning said movable assembly from a zone of positions in which the operating means is ineffective to control the contact members to a zone of positions in which the operating means establishes control of said contact members by said operating means.

9. In combination, an electrical apparatus, protective means therefor including a circuit interrupter actuated for controlling a circuit upon a predetermined condition of the apparatus, means for resetting said circuit interrupter to its initial position including an electroresponsive element and a switch for controlling the operation of the electroresponsive element, said switch comprising a movable assembly including a supporting member, a pair of elongated self-biasing leaf-spring circuit controlling members mounted thereon and switch contact members carried thereby and normally biased to circuit interrupting positions, operating means mounted for movement transversely of the direction of said circuit controlling members for engaging the end of one of said circuit controlling members for closing a circuit through said switch contact members, a pair of bimetal elements each formed as a double helix and each connected to one of said switch contact members and heated by the flow of current therethrough for moving said movable assembly for releasing said contact members from control by said operating means for effecting the separation of the switch contact members, said bimetal elements being effective, upon the interruption of current flow through said switch contact members for returning said movable support after a time interval to a position for establishing further control of said contact members by said operating means.

MERRILL G. LEONARD.